United States Patent [19]

Sakata

[11] Patent Number: 5,311,315
[45] Date of Patent: May 10, 1994

[54] GHOST DETECTOR WITH TIME REVERSAL PROCESSING

[75] Inventor: Haruo Sakata, Tokyo, Japan
[73] Assignee: Clarion Co., Ltd., Tokyo, Japan
[21] Appl. No.: 86,860
[22] Filed: Jul. 7, 1993

[30] Foreign Application Priority Data

Jul. 9, 1992 [JP] Japan .................................. 4-205972
Aug. 7, 1992 [JP] Japan .................................. 4-233030

[51] Int. Cl.$^5$ ............................................ H04N 5/213
[52] U.S. Cl. .................................................... 346/614
[58] Field of Search .................. 358/905, 167, 36, 37, 358/166; 379/410, 411; H04N 5/213, 5/208

[56] References Cited

FOREIGN PATENT DOCUMENTS 58-133085  8/1983  Japan .................................. 358/905
2118805 11/1983  United Kingdom .................. 358/905

*Primary Examiner*—James J. Groody
*Assistant Examiner*—Cheryl Cohen
*Attorney, Agent, or Firm*—Burns, Doane, Swecker & Mathis

[57] ABSTRACT

In a ghost detector, synchronous detection is performed on a received video signal to provide a detected signal which is then converted to a band-limited signal having a predetermined bandwidth, a scanning synchronous component signal is extracted from the detected signal to provide a switching control signal for a ghost component detecting period on the basis of the synchronous component signal, and the band-limited signal is switched in response to the switching control signal so as to provide a switching signal. Then, the bandwidth of the switching signal is broadened to provide a time-compressed processing signal by a write/read operation for the switching signal on the basis of a predetermined control signal, time reversal on the processing signal is performed in an order reverse to the order of writing/-reading the processing signal to provide a time-reversed signal, the processing signal is delayed by the period of the time reversal to provide a delay signal, the time-reversed signal and the delay signal are amplitude modulated by a predetermined carrier component signal to produce associated amplitude modulated signals, and a correlation signal that contains a significant waveform representing a ghost component of the received video signal is obtained.

16 Claims, 8 Drawing Sheets

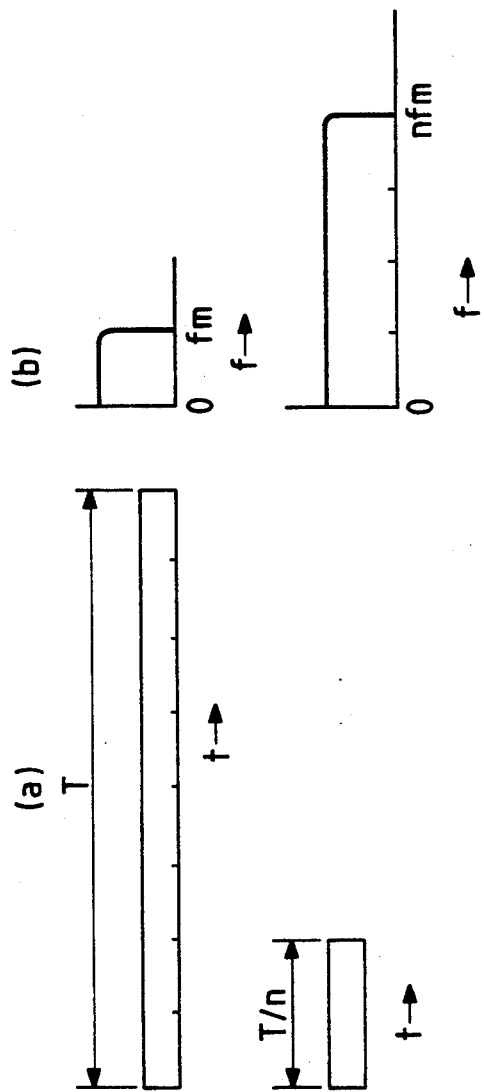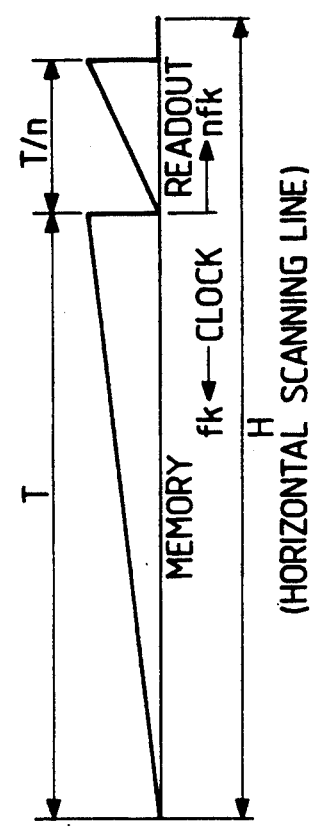
FIG. 1(A)
FIG. 1(B)
FIG. 2

FIG. 4
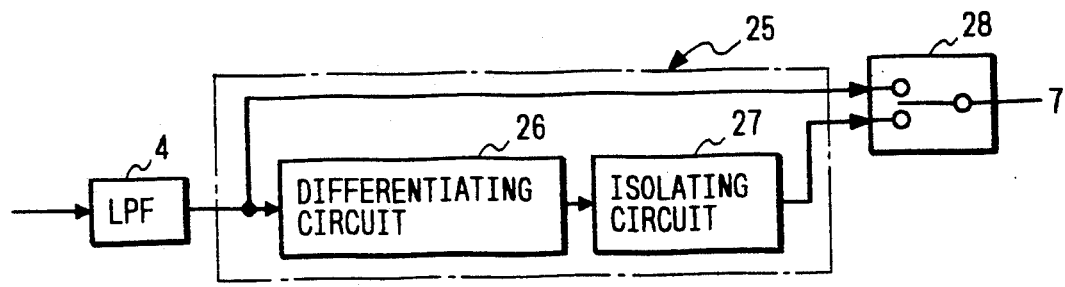
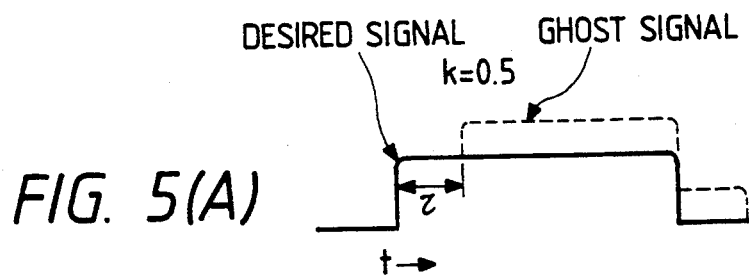
FIG. 5(A)
FIG. 5(B)
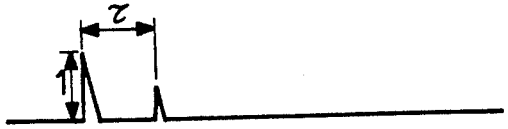
FIG. 5(C)

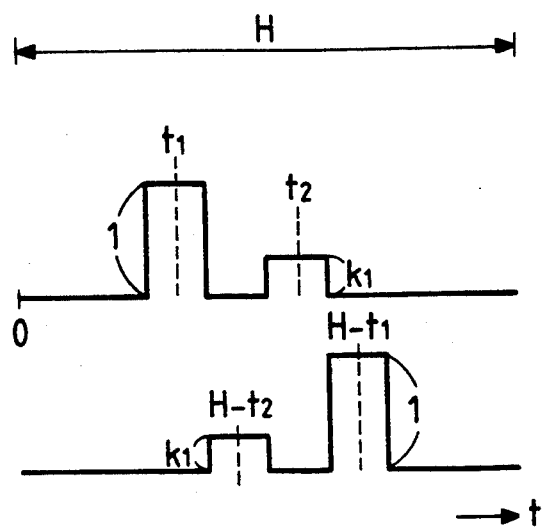
FIG. 8(A)
FIG. 8(B)
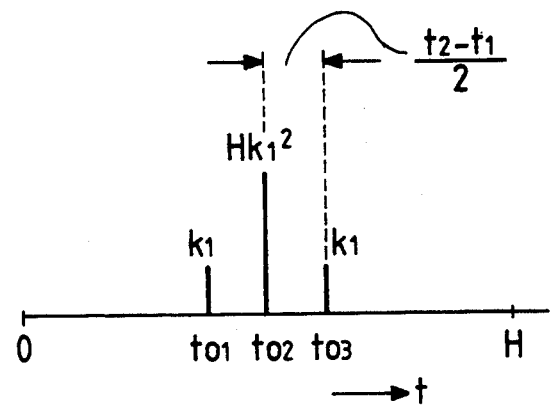
FIG. 9
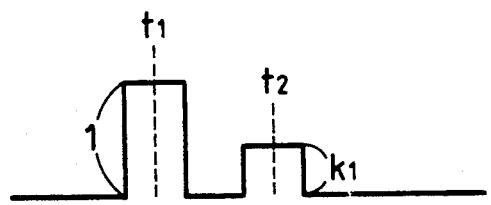
FIG. 10(A)
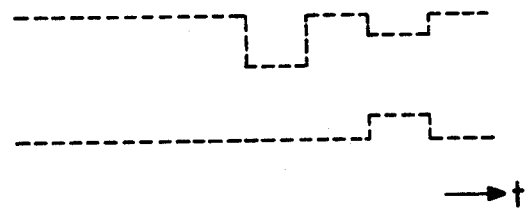
FIG. 10(B)
FIG. 10(C)

GHOST DETECTOR WITH TIME REVERSAL PROCESSING

BACKGROUND OF THE INVENTION

1. Field of the Invention

The invention relates to a ghost detector for detecting a reflected wave (so-called "ghost" which is generated upon signal reception in television broadcasting) from buildings or other obstacles that is superimposed on a direct wave. More particularly, the invention relates to a ghost detector suitable for use in signal reception by mobile receivers. The invention also relates to a ghost suppressor for suppressing the unwanted effects of ghost.

2. Discussion of the Related Art

A conventional circuit for removing reflected wave components from the signal received by a television receiver is well known as a "ghost canceler" and used for the purpose of signal reception by fixed receivers. In such a ghost canceler, a reference signal (GC signal) for vertical blanking is extracted from a video signal and any distortion present in the waveform of the received signal is corrected by a suitable apparatus such as a transversal filter so that the reflected component which was undesirably added to the reference signal is reduced to zero.

According to this conventional method of suppressing reflected waves, the reference signal for vertical blanking exists only for an extremely short time within a field period (1/60 second in the NTSC system) and the magnitude of the reflected wave component and the time of reflection are compensated, i.e., controlled to be reduced, for every 1/60 second, requiring a certain time, typically 3 to 4 seconds, for the reflected wave component to level off toward zero. When electric waves for television broadcasting are to be received by a fixed receiver, several seconds may well be taken to suppress the reflected wave and, hence, the above-described conventional method will cause no practical problems. However, this conventional method which takes time in ghost detection is unable to measure the actual generation of ghost during signal reception by a mobile receiver, making it impossible to realize a high-speed ghost canceler.

A further problem with the conventional system is that if a SAW (Surface Acoustic Wave) convolver is directly used as a correlating device, the time required for the convolver to achieve correlation is very short, only a fraction of the length of scanning lines for television and, as a result, it has been impossible to detect ghosts of short delay time. If the time required for the convolver to achieve correlation is prolonged, the propagation loss which is caused during the correlating operation will increase to an impractical level.

SUMMARY OF THE INVENTION

The present invention has been accomplished under these circumstances and has as an object providing a ghost detector that is capable of measuring the state of ghosts in the signal that is being received under such conditions that the intensity of the signal to be received changes every moment.

In order to attain the above object, the invention provides a ghost detector including: wave detecting and band limiting means for performing synchronous detection on a received video signal to provide a detected signal which is converted to a band-limited signal having a predetermined bandwidth; switching control signal output means for extracting a scanning synchronous component signal from the detected signal to provide a switching control signal for a ghost component detecting period on the basis of the synchronous component signal; switching means, supplied with the band-limited signal, for switching on the band-limited signal in response to the switching control signal so as to provide a switching signal; memory means for broadening the bandwidth of the switching signal while providing a time-compressed processing signal by a write/read operation for the switching signal on the basis of a predetermined control signal; time reversing means for performing time reversal on the processing signal in an order reverse to the order of writing/reading the processing signal to provide a time-reversed signal; delay means for providing a delay signal that is obtained by delaying the processing signal by the period of the time reversal; amplitude modulation means for amplitude modulating the time-reversed signal and the delay signal by a predetermined carrier component signal to produce associated amplitude modulated signals; and correlation signal output means, supplied with the respective amplitude modulated signals, for providing a correlation signal that contains a significant waveform representing a ghost component of the received video signal.

Also, the invention provides a ghost suppressor including: video component signal output means for converting a received video signal to a predetermined intermediate frequency component signal and for detecting the intermediate frequency component signal to produce a video component signal; switching means for extracting a horizontal synchronous component signal from the video component signal and for switching on the video component signal to produce at least two video output signals; video output signal processing means for performing a predetermined time axis reversal on one of the video output signals and for delaying the other video output signal by a predetermined time in accordance with the time axis reversal; correlation operating means for operating the correlation between the respective video output signals thus processed by the video output signal processing means to provide a correlation output signal corresponding to a ghost component contained in the video component signal; and ghost component suppressing means for synthesizing a control signal that has been given a predetermined delay time and amplitude on the basis of the correlation output signal with the video component signal so as to suppress the ghost component.

BRIEF DESCRIPTION OF THE DRAWINGS

FIGS. 1(A) and 1(B) are explanatory diagrams showing how a signal changes in response to the compression of time axis;

FIG. 2 is a diagram showing the distribution of time in a compression mode;

FIG. 4 is a block diagram showing an exemplary configuration of the waveform processing circuit shown in FIG. 3;

FIGS. 5(A) to 5(C) are diagrams showing the waveform processed by the waveform processing circuit shown in FIG. 4;

FIGS. 8(A) and 8(B) are waveform diagrams showing an example of the input signal to the scan reverse circuit shown in FIG. 7, as well as the output signal from the same circuit;

FIG. 9 is a timing chart of the output from the correlation circuit shown in FIG. 7;

FIGS. 10(A) to 10(C) are waveform diagrams for explaining how a ghost component is removed in the embodiment shown in FIG. 7;

DETAILED DESCRIPTION OF THE PREFERRED EMBODIMENTS

FIGS. 1(A) and 1(B) are explanatory diagrams showing the change that occurs in a signal when the time axis is compressed. Part (a) of FIG. 1(A) shows the signal length T of an original signal, and part (b) of FIG. 1(A) shows the maximum frequency $f_m$ of the original signal. When this original signal is compressed to a length of 1/n, the signal length is compressed to T/n as shown in part (a) of FIG. 1(B) whereas the bandwidth (maximum frequency) is increased to $nf_m$ as shown in part (b) of FIG. 1(B).

An example of the ghost detector for detecting the ghost in a received signal according to the present invention will be described later with reference to FIG. 3. If, in that ghost detector, the signal length T is stored in memory in a write mode in response to a clock signal having the frequency $f_k$ and if readout is effected with a clock signal having the frequency $nf_k$, the original signal shown in FIG. 1(A) is compressed into the signal shown in FIG. 1(B).

FIG. 2 is a diagram showing the distribution of time in each horizontal scanning operation in a compression mode. If processing is completed within a unit time of image composition (63.5 μs which is nearly equal to H or the length of horizontal scanning line for television), the same processing is performed for each line (scanning line) in a signal circuit. With reference to FIG. 2, if the signal length T which is part of the length of one line H is stored in memory in response to the clock signal $f_k$, followed by readout in response to the clock signal $nf_k$, the signal length is compressed to T/n. Therefore, processing will be completed in one line if the signal length T and line H satisfy the following conditions:

$$T + T/n \leq H \quad (1)$$

$$\{(1+n)/n\}T \leq H, \text{ namely } T \leq \{n/((n+1))\}H \quad (1')$$

If n=4, conditions (1) and (1') dictate that T≤0.8H, meaning that 80% of one line will be subjected to ghost detection.

Figure 3:
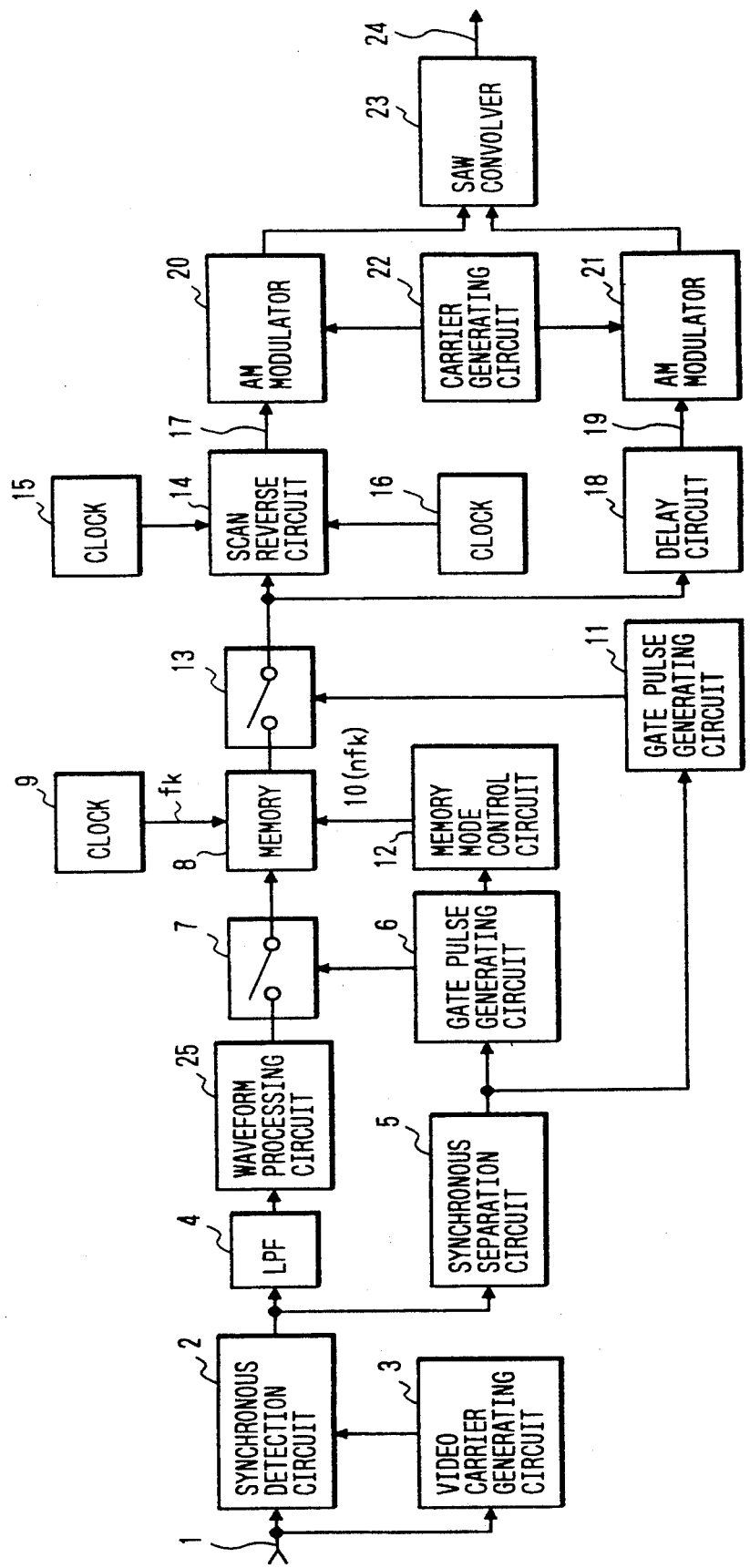
FIG. 3 is a block diagram showing a ghost detector according to an embodiment of the first aspect of the present invention.

FIG. 3 is a block diagram showing a ghost detector according to an embodiment of the present invention. Shown by reference numeral 1 is an IF (intermediate frequency) signal; 2 is a synchronous detection circuit; 3 is a video carrier generating circuit; 4 is a LPF (low-pass filter); 5 is a synchronous separation circuit; 6 is a gate pulse generating circuit; 7 is a switch circuit; 8 is a memory; 9 is a write clock generator for generating a clock signal having the frequency $f_k$; 10 is a read clock having the frequency $nf_k$; 11 is a gate pulse generating circuit; 12 is a memory mode control circuit for controlling the mode of write into or read from the memory; 13 is a switch circuit; 14 is a scan reverse circuit, for example, a memory; 15 is a write clock generator; 16 is a read clock generator; 17 is a reverse scan signal; 18 is a delay circuit; 19 is a delayed signal; 20 and 21 are each a modulator for amplitude modulation (AM); 22 is a carrier generating circuit for convolver; 23 is a surface acoustic wave (SAW) convolver; 24 is a correlation output; and 25 is a waveform processing circuit.

With reference to FIG. 3, the video IF signal 1 is supplied into the synchronous detection circuit 2 and the video carrier generating circuit 3. The output of the video carrier generating circuit 3 is supplied into the synchronous detection circuit 2, in which the IF signal 1 is subjected to synchronous detection with the carrier wave which is the output of the video carrier generating circuit 3.

The LPF 4 is a low-pass filter that permits the passage of frequencies of 0 to 1 MHz (or 0 to 0.5 MHz) for picking up both sidebands of the video carrier signal output from the synchronous detection circuit 2. The output of the LPF 4 is sent to the waveform processing circuit 25 (to be described later with reference to FIG. 4), thence supplied to the switch circuit 7 where it is subjected to switching action as one ghost detection period T alternates with another.

To this end, the output of the synchronous detection circuit 2 is supplied to the synchronous separation circuit 5, the output of which in turn is supplied to the gate pulse generating circuit 6, producing an output gate pulse (pulse width=T which is smaller than one line period H) that gates the switch circuit 7. The output of the switch circuit 7 is written into the memory 8 in synchronism with the write clock 9 having the signal frequency $f_k$ (i.e., write mode).

After the end of write mode, the memory 8 enters into a read mode as shown in FIG. 2. The signal that has been written into the memory 8 is read out in synchronism with the read the clock 10 having the signal frequency $nf_k$ that is produced from the memory mode control circuit 12 in response to the output pulse (amplitude=H−T) from the gate pulse generating circuit 6. Hence, the time axis is compressed and the original signal having the signal length T and maximum frequency $f_m$ is compressed by 1/n in length. Then, if the original signal length is T, it is compressed to T/n as shown in part (a) of FIG. 1(B) and the bandwidth of the compressed signal (maximum frequency) is increased to $nf_m$ as shown in part (b) of FIG. 1(B).

The output from the synchronous separation circuit 5 is also supplied into the gate pulse generating circuit 11, which outputs a gate pulse having the pulse width of T/n that turns on the switch circuit 13. As shown in FIG. 1(B), the output of the switch circuit 13 is compressed in time to T/n whereas its bandwidth is increased to $nf_m$. Since the LPF 4 is adapted for permitting the passage of frequencies in the range of 0 to 1 MHz, the maximum frequency ($f_m$) of the original signal is 1 MHz and, if n=4, the maximum frequency is expanded to a broader bandwidth of $nf_m=4$ MHz.

The output of the switch circuit 13 is stored in the scan reverse circuit 14. The scan reverse circuit 14 is, for example, a memory that performs the following operations: storing a signal of the length T/n in synchronism with lock from the write clock generator 15; and reading out the signal in synchronism with clock from the read clock generator 16 in an order reverse to the order of storage in synchronism with the clock from the write clock generator 15, thereby producing the reverse scan signal 17. The output from the switch circuit 13 is also supplied into the delay circuit 18, producing the delayed signal 19. The delay time of the delay circuit 18 is set to be equal to the time of processing by the scan reverse circuit 14.

Then, the reverse scan signal 17 from the scan reverse circuit 14 is supplied into the AM modulator 20 and the delayed signal 19 is supplied to the other AM modulator 21. The carrier generating circuit 22 outputs a carrier wave having an appropriate frequency (e.g. 20 MHz) for propagation through the SAW convolver 23. The carrier wave is applied to the AM modulators 20 and 21. The outputs of the AM modulators 20 and 21 are supplied to the two input terminals of the SAW convolver 23 to produce the correlation output 24. Since the original signal has been compressed to 1/n in the memory 8, the correlation output 24 also has its time distribution compressed to 1/n.

FIG. 4 is a block diagram showing an exemplary configuration of the waveform processing circuit 25. The output signal from the LPF 4, as a result of the bandwidth limitation (below 1 MHz in the embodiment under consideration), is supplied into the waveform processing circuit 25. Shown by reference numeral 26 in FIG. 4 is a differentiating circuit and 27 is a unipolar isolating circuit which, in the embodiment under consideration, is assumed to pick up only a signal of positive polarity (as accomplished by a diode). The differentiating circuit 26 and the unipolar isolating circuit 27 combine to form the waveform processing circuit 25. Shown by reference numeral 28 is a mode select switch that bypasses the waveform processing circuit 25 if there is no need to process waveforms therewith.

FIGS. 5(A) to 5(C) are diagrams showing how waveforms are processed with the waveform processing circuit 25. FIG. 5(A) shows the waveform of the output signal from the LPF 4; as shown, it is the combination of the desired signal corresponding to the direct wave indicated by a solid line and a ghost signal which is generated in response to reception of the reflected wave with an amplitude coefficient of 0.5 that is delayed by delay-time $\tau$ from the desired signal and which is superposed on the desired signal as indicated by a dashed line. In other words, the ghost signal is generated due to the reception of the reflected wave which is delayed by the delay-time $\tau$ from the reception of the direct wave. FIG. 5(B) shows the waveform of the output from the differentiating circuit 26 which is the differential form of the signal shown in FIG. 5(A). FIG. 5(C) shows the waveform of the output from the unipolar isolating circuit 27 which is equivalent to a means of picking up a portion of positive polarity from the output of the differentiating circuit 26.

Figure 6A:
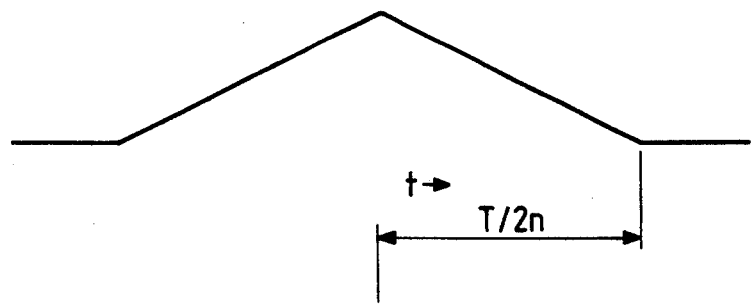
FIGS. 6(A) to 6(E) are waveform diagrams for correlation output that varies depending upon whether waveform processing is performed or not.
Figure 6B:
Figure 6C:
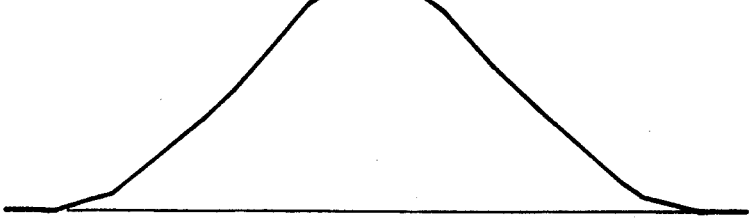
Figure 6D:
Figure 6E:
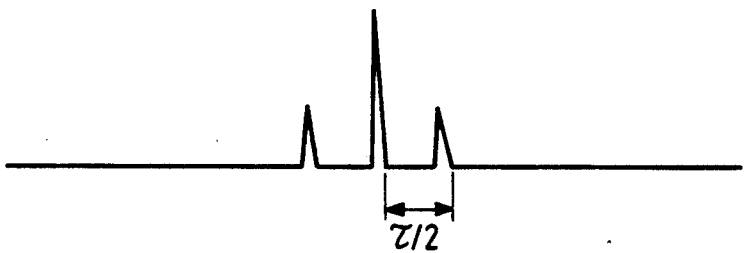

FIGS. 6(A) to 6(E) are waveform diagrams showing various correlation outputs that depend on whether waveform processing is performed or not. FIG. 6(A) shows the waveform of a correlation output that is produced when the desired signal (as indicated by a solid line in FIG. 5(A)) is supplied as the input. FIG. 6(B) shows the waveforms of correlation outputs that are produced in three cases, one where the ghost signal as shown in FIG. 5(A) is supplied as the input, another case where the desired signal is supplied as the input, and the third case where two ghost signals are supplied as the input. FIG. 6(C) shows the waveform of a correlation output that is produced when the combination of the desired signal and the ghost signal as shown in FIG. 5(A) is supplied as the input (the output is the sum of the outputs shown in FIGS. 6(A) and 6(B)). Obviously, the correlation between the desired signal and the ghost signal is not clearly represented in the waveform diagram of FIG. 6(C). FIG. 6(D) shows the waveform of a correlation output that is produced after the waveform processing of only the desired signal (see FIG. 5(C)) and which corresponds to FIG. 6(A) in the absence of waveform processing. FIG. 6(E) shows the waveform of a correlation output that is produced after the waveform processing of the desired signal plus ghost signal (see FIG. 5(C)) and which corresponds to FIG. 6(C) in the absence of waveform processing. Obviously, the correlation between the desired signal and the ghost signal is clear in the waveform diagram of FIG. 6(E).

For ghost identification, the waveform shown in FIG. 6(E) may be displayed for each scanning in the television system. If the desired signal shown in FIG. 6(D) or 6(E) is used to generate a horizontal sync signal, the distribution of ghost for each line can be displayed on a television monitor screen.

The ghost detector of the present invention may be applicable to the ghost detecting portion of a ghost canceler.

As described on the foregoing pages, the ghost detector according to the first aspect of the present invention is capable of measuring ghosts that develop under such conditions as in the reception of television electric waves by mobile receivers where the electric field of signal reception varies every moment. As a further advantage, the ghost detector is capable of producing a clear correlation between the desired signal and the ghost signal by performing an appropriate waveform processing.

Figure 7:
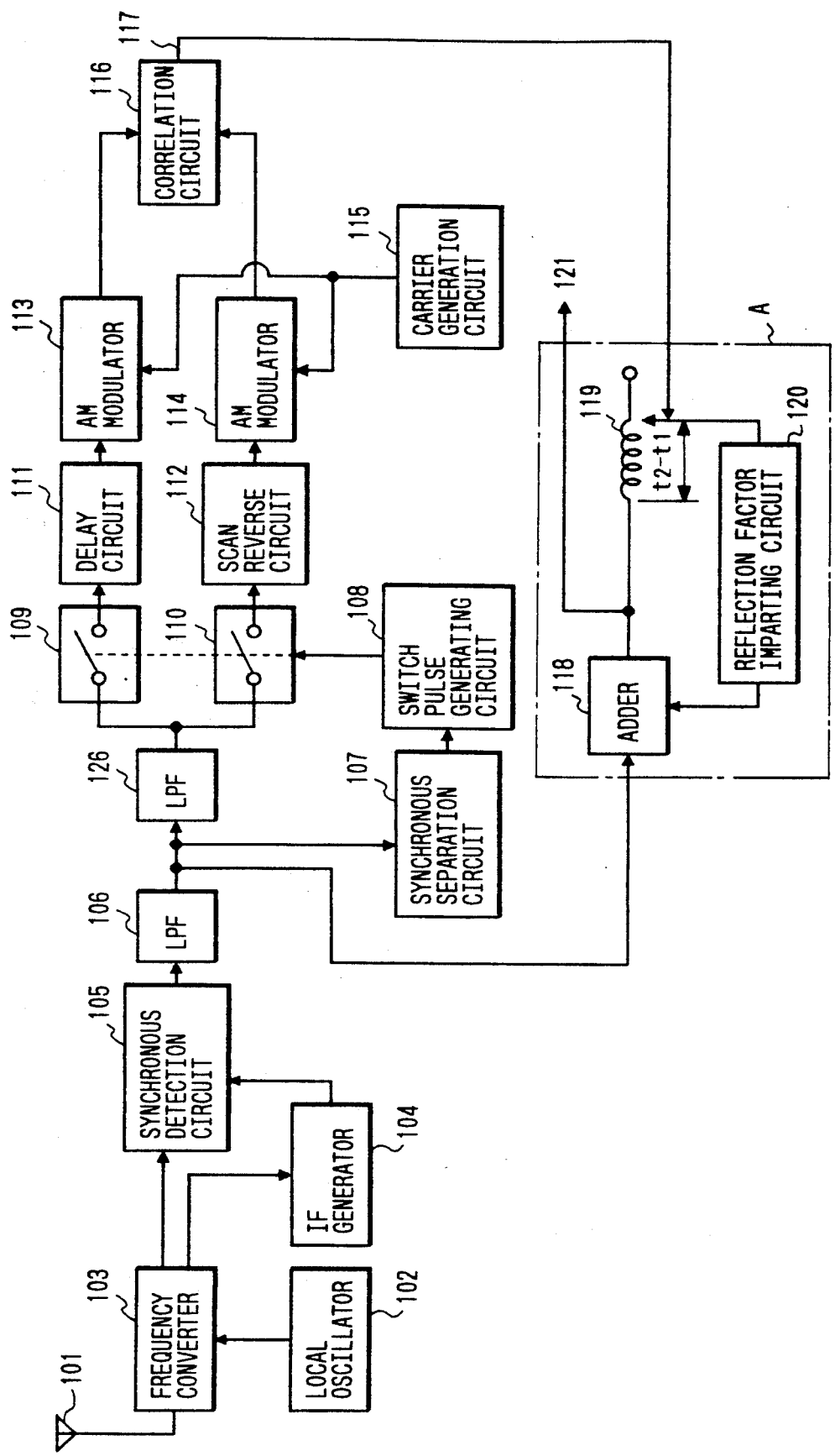
FIG. 7 is a block diagram showing a ghost suppressor according to an embodiment of the second aspect of the present invention.

In the second aspect, the present invention provides a ghost suppressor. FIG. 7 shows a ghost suppressor according to an embodiment of the invention. Shown by reference numeral 101 is a signal receiving antenna; 102 is a local oscillator; 103 is a frequency converter; 104 is an intermediate frequency generator; 105 is a synchronous detection circuit; and 106 is a video LPF (low-pass filter) that permits the passage of frequencies of 0 to 4.2 MHz.

Shown by reference numeral 107 in FIG. 7 is a synchronous separation circuit 107; 108 is a switch pulse generating circuit; and 109 and 110 are switchers.

Also shown by reference numeral 111 in FIG. 7 is a delay circuit; 112 is a scan reverse circuit; 113 and 114 are each an AM modulator; and 115 is a carrier generating circuit. Shown by reference numeral 116 is a correlation circuit, e.g., SAW convolver.

Shown by reference numeral 118 is an adder; 119 is a delay circuit; and 120 is a reflection factor imparting circuit. Shown by reference numeral 126 in FIG. 7 is another low-pass filter that permits the passage of frequencies of 0 to 1 MHz.

In the apparatus shown in FIG. 7, a signal received by the antenna 101 is supplied into the frequency converter 103 and an IF (intermediate frequency) component signal that provides the difference between the frequency of the received signal and that of an oscillation signal from the local oscillator 102 is supplied into the IF generator 104 and the synchronous detection circuit 105. The IF generator 104 typically includes an amplitude limiter and a PLL circuit, and supplies the synchronous detection circuit 105 with a continuous wave of the IF signal, $\cos \omega_i t$ ($\omega_i$: IF frequency) for synchronous detecting of the IF signal. The thus detected video component signal is sent to the low-pass filter 106, from which it is supplied not only to the synchronous separation circuit 107 but also to the adder 118 in the ghost component removing circuit A. At the same time, the video component signal is sent to the other low-pass filter 126, from which it is supplied to the switchers 109 and 110.

The synchronous separation circuit 107 separates the horizontal-sync signal from the video component signal. The switch pulse generating circuit 108 produces a horizontal-sync switch pulse from the separated horizontal-sync signal. The switch pulse varies depending on the length of the scan reverse circuit 112 to be described later and in response to that pulse, the switcher 109 or 110 is selectively driven. The video component signal is selectively passed by the closing of the switcher 109 or 110 to produce at least two video output signals, which are then supplied to the delay circuit 111 and the scan reverse circuit 112. The low-pass filter 126 is effective in the case where only both sideband components of television electric waves are to be used and it is also effective to provide a band-pass filter of $\pm 1$ MHz on the input side of the IF generator 104.

The scan reverse circuit 112 may be of a known type that is operated in the following manner: the horizontal scan period of television signal is stored in a memory and the addresses in that memory are read in a reverse order with respect to the recording mode, whereby reverse scan is performed on a time basis so as to produce an output signal that has its time axis reversed to that of the input signal. Assuming that the case of one line (1H) is taken, the input signal shown in FIG. 8(A) is read out as the output signal that is shown in FIG. 8(B). As a matter of course, the output signal thus read out is delayed by one line from the input signal and, hence, the delay circuit 111 is used to adjust the associated delay time. It should, however, be noted that the outputs of circuits 111 and 112 which have a delay time equivalent to the length Of horizontal scanning lines are opposite to each other in terms of the direction of time axis.

The video output signals from the circuits 111 and 112 are applied to the AM modulators 113 and 114, where they are modulated with a carrier wave of the frequency $\omega_0$ from the carrier generating circuit 115. The video output signals are thus modulated again in order to have them matched to the operating frequency of the correlation circuit 116 and $\omega_0$ is set to be equal to the center frequency of a device such as SAW convolver that composes the correlation circuit 116.

The two input terminals of the correlation circuit 116 are supplied with the delayed video output signal and the scan-reversed video output sinal after they have been amplitude modulated in the manner described above. As shown in FIG. 9, the correlation circuit 116 produces at time $t_{01}$ an output that represents the correlation between a pulse of amplitude "1" (see time $t_1$ in FIG. 8(A)) and a pulse of amplitude "$k_1$" (see time $H-t_2$ in FIG. 8(B)), provided that $t_{01} = (H-t_2+t_1)/2$. At time $t_{02} = H/2$, a correlation output with the amplitude $1+k_1^2$ is produced whereas at time $t_{03} = (H-t_1+t_2)/2$, a correlation output with the amplitude $k_1^1$ is produced.

The time interval between the desired signal (with amplitude "1" as shown in FIG. 8(A)) and the ghost signal (with amplitude "$k_1$" as shown in FIG. 8(A)) is $t_2-t_1$ but, as is clear from FIG. 9, the corresponding time interval is $(t_2-t_1)/2$ for the correlation output. In other words, the time between peak amplitudes in the correlation output for the period from $t_{02}$ to $t_{03}$ is $(t_2-t_1)/2$ and the amplitude of the output at $t_{03}$ is $k_1$; therefore, the correlation circuit 116 produces a correlation output 117 in the form of a pulse that has the amplitude $k_1$ and which has been delayed by the time $(t_2-t_1)/2$. It should be noted here that the delay time may be doubled to $t_2-t_1$.

In the next step, the video component signal branched from the low-pass filter 106 is supplied to the ghost component removing circuit A, where the ghost component of the video component signal is suppressed on the basis of the correlation output 117. The ghost component removing circuit A includes the adder 118, delay circuit 119 and reflection factor imparting circuit 120.

Supposing here that the low-pass filter 106 provides an input signal (having amplitude "1" at time $t_1$) contains a reflected wave (ghost) having amplitude $k_1$ at time $t_2$, the ghost component removing circuit A operates in the following manner.

The input signal is supplied to the adder 118, the output of which is supplied to the delay circuit 119. The delay time of the delay circuit 119 is so set by the correlation output 117 to be equal to $t_2-t_1$. The delayed output from the delay circuit 119 is supplied to the reflection factor imparting circuit 120, where it is controlled to have the amplitude $-k_1$ before being fed back to the adder 118. The resulting feedback signal is as shown in FIG. 10(B) and if this is added to the input signal (see FIG. 10(A)), the reflected wave (ghost) at $t_2$ is canceled, causing a reflected wave (see FIG. 10(B)) of amplitude $-k^2$ to appear at the time spaced by $2(t_2-t_1)$ from the desired signal occurring at time $t_1$.

In the next feedback cycle, a feedback signal of the waveform shown in FIG. 10(C) is produced and the component having the amplitude $k^2$ is suppressed, leaving the component of $k^3$ behind. However, since $k<1$, the effect of the reflected wave will decrease rapidly.

Figure 11:
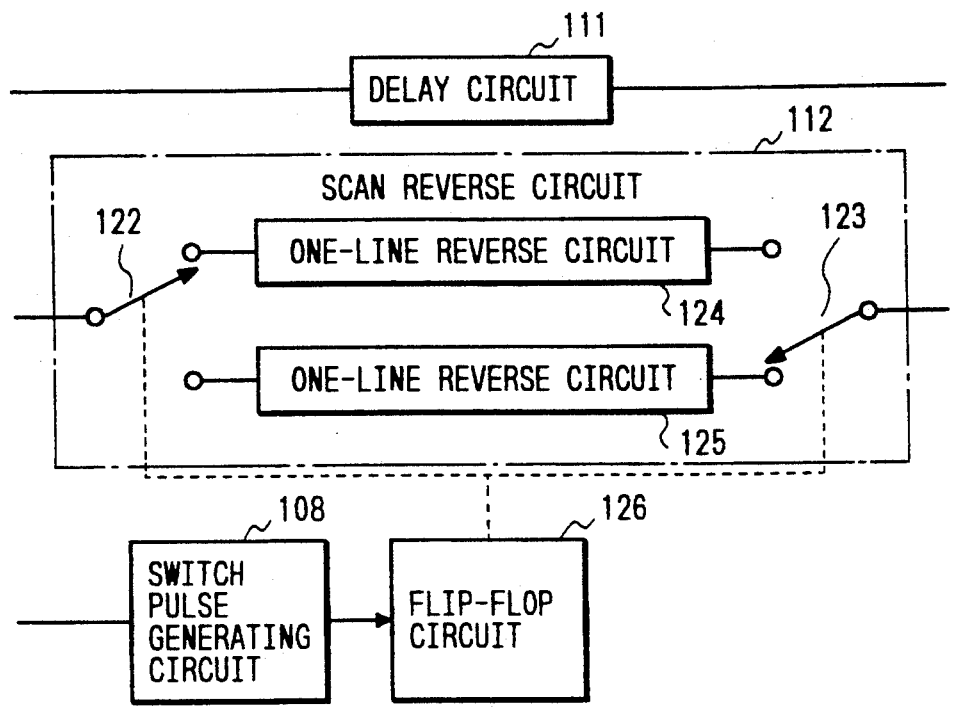
FIG. 11 is a block diagram showing one modification of the embodiment shown in FIG. 7.

FIG. 11 shows an example where the scan reverse circuit 112 and the delay circuit 111 are adjusted for the time length of one line (H). Shown by reference numerals 122 and 123 are electronic switches, 124 and 125 are one-line reverse circuits, and 126 is a flip-flop circuit. The electronic switches 122 and 123 are driven in opposite phases by horizontal-sync switch pulses from the circuit 108 after they have been adjusted by the flip-flop circuit 126 to have the frequency $f_H/2$ ($f_H$ is the horizontal-sync frequency); the scan reverse circuits 124 and 125 are used alternately to produce a scan-reversed continuous signal.

The case shown in FIG. 11 assumes the use of two reverse circuits. Alternatively, the switches 122 and 123 are left as they are and the correlation circuit 116 is operated every two lines to produce the correlation output 117, which is stored in a suitable memory and read out over two lines for subsequent use. This construction offers the advantage of realizing an economical system.

Figure 12A:
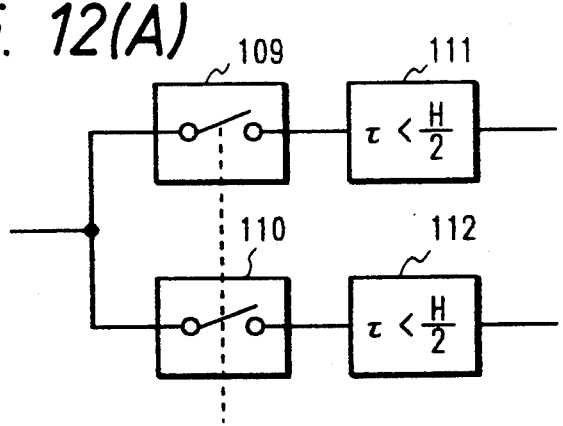
FIG. 12(A) is a block diagram showing another modification of the embodiment shown in FIG. 7.
Figure 12B:
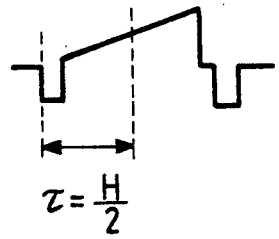
FIG. 12(B) is a diagram illustrating the operation of that modification.

If the delay time $\tau$ of the scan reverse circuit 112 is smaller than H/2 as shown in FIG. 12(A), part of the input signal (with period $\tau<H/2$) may be selected to attain correlation. Consider, for example, the case shown in FIG. 12(B); $\tau$ is set to be equal to H/2 and correlation is taken for the period H/2 from horizontal synchronization (as a matter of course, the delay time of the delay circuit 111 is also equal to H/2). In the absence of long-delayed reflected waves, the configuration shown in FIG. 12(A) will suffice. It offers the added advantage that not only the scan reverse circuit 112 but also the correlation circuit 116 may have a simple configuration that is as short as $\tau$.

In the embodiment under consideration, the synchronous detection circuit 105 performs its function by means of the IF signal cos $\omega_i t$. If desired, synchronous detection may be performed with the signal sin $\omega_i t$ crossed to the signal cos $\omega_i t$ and the correlation coefficient may be also determined for the produced crossed component, thereby suppressing the reflected wave (ghost).

In the system shown in FIG. 7, signal processing based on the principle illustrated in FIG. 8 is performed in the ghost component removing circuit A for the purpose of canceling the first reflected wave (ghost). If desired, one or more circuits of the same configuration may be provided in cascade at the subsequent stages so as to remove the second and third reflected waves.

The foregoing description assumes that all of the ghost components to be suppressed are delayed (i.e., $t_2 - t_1 > 0$). The desired signal arrives earlier than ghosts under most conditions of signal reception. However, depending on the complexity of the lay of the land or the layout of buildings, ghosts (of small amplitude) may arrive earlier than the desired signal. For example, a reflected wave that is delayed but larger than the desired signal in amplitude, the ghost as detected arrives earlier than the desired signal and $t_2 - t_1 < 0$.

Figure 13:
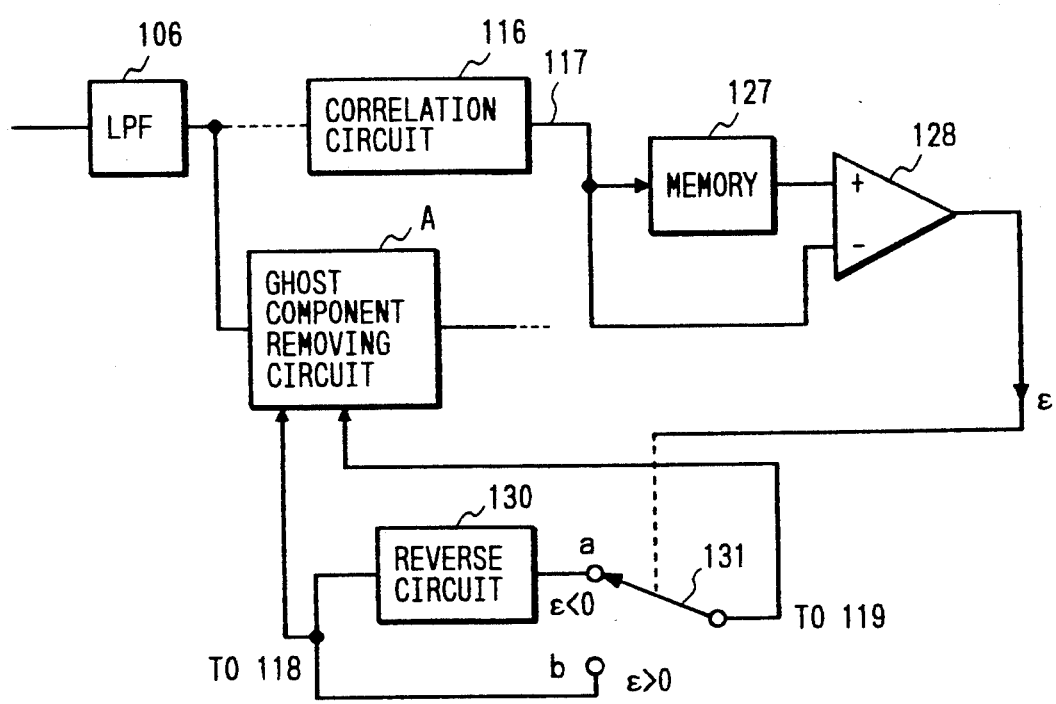
FIG. 13 is a block diagram showing still another modification of the embodiment shown in FIG. 7.

To cope with this situation, a circuit having the configuration shown in FIG. 13 is added to the basic system shown in FIG. 7. Referring to FIG. 13, the correlation circuit 116 produces the correlation output 117 and its reflection factor is stored in a memory 127 for comparison in a comparator 128 with the reflection factor $k_n$ of the correlation output 117 that is produced by scanning for the next line. Supposing here that the comparison output is $\epsilon$, if $\epsilon > 0$, the output of the delay circuit 119 is added to the adder 118 via terminal b of a switch 131. However, if $\epsilon < 0$, the switch 131 is closed at terminal a and the output of the delay circuit 119 is added to the adder 118 via a reverse circuit 130. In this way, the reflection factor $k_n$ will decrease automatically.

If desired, the scan reverse circuit 112 and the delay circuit 111 may be adapted to operate in the video IF band. In this case, the frequency converter 103 may be so designed that its output is directly applied to the switchers 109 and 110 while, at the same time, the AM modulators 113 and 114 are configured as frequency converters that convert the IF signal to one having a frequency appropriate for the correlation circuit 116.

As described on the foregoing pages, the ghost suppressor according to the second aspect of the present invention measures the reflected component of a video signal in horizontal synchronization and, hence, the reflected component which varies at high speed as in signal reception by mobile receivers can be positively detected and compensated to produce a ghost-free image of high quality.

What is claimed is:

1. A ghost detector comprising:
   wave detecting and band limiting means for performing synchronous detection on a received video signal to provide a detected signal which is converted to a band-limited signal having a predetermined bandwidth;
   switching control signal output means for extracting a scanning synchronous component signal from the detected signal to provide a switching control signal for a ghost component detecting period on the basis of the synchronous component signal;
   switching means, supplied with the band-limited signal, for switching on the band-limited signal in response to the switching control signal so as to provide a switching signal;
   memory means for broadening the bandwidth of the switching signal while providing a time-compressed processing signal by a write/read operation for the switching signal on the basis of a predetermined control signal;
   time reversing means for performing time reversal on the processing signal in an order reverse to the order of writing/reading the processing signal to provide a time-reversed signal;
   delay means for providing a delay signal that is obtained by delaying the processing signal by the period of the time reversal;
   amplitude modulation means for amplitude modulating the time-reversed signal and the delay signal by a predetermined carrier component signal to produce associated amplitude modulated signals; and
   correlation signal output means, supplied with the respective amplitude modulated signals, for providing a correlation signal that contains a significant waveform representing a ghost component of the received video signal.

2. The ghost detector according to claim 1, further comprising waveform processing means for processing the waveform output from said wave detecting and band limiting means, said waveform processing means including differentiating means for differentiating the band-limited signal from said wave detecting and band limiting means to produce a differentiated component signal and unipolar component isolating means for separating a unipolar component signal from the differentiated component signal, the unipolar component signal being supplied into said switching means which performs switching on the unipolar component signal in response to the switching control signal to produce the switching signal.

3. The ghost detector according to claim 1, wherein said wave detecting and band limiting means comprises a synchronous detection circuit for performing synchronous detection of the received video signal, a carrier generating circuit for generating a carrier wave to be supplied to said synchronous detection circuit, and a low-pass filter for converting the detected signal supplied from said synchronous detection circuit to the band-limited signal.

4. The ghost detector according to claim 1, wherein said switching control signal output means comprises a synchronous separation circuit for extracting the scanning synchronous component signal from the detected signal and a gate pulse generating circuit for generating the switching control signal on the basis of the synchronous component signal.

5. The ghost detector according to claim 1, wherein said time reversing means comprises a memory from which the processing signal stored therein is read in the order reverse to the writing order.

6. The ghost detector according to claim 1, wherein said correlation signal output means comprises an SAW convolver.

7. The ghost detector according to claim 2, wherein said wave detecting and band limiting means comprises a synchronous detection circuit for performing synchronous detection of the received video signal, a carrier generating circuit for generating a carrier wave to be supplied to said synchronous detection circuit, and a low-pass filter for converting the detected signal supplied from said synchronous detection circuit to the band-limited signal.

8. The ghost detector according to claim 2, wherein said switching control signal output means comprises a synchronous separation circuit for extracting the scanning synchronous component signal from the detected signal and a gate pulse generating circuit for generating the switching control signal on the basis of the synchronous component signal.

9. The ghost detector according to claim 2, wherein said time reversing means comprises a memory from which the processing signal stored therein is read in the order reverse to the writing order.

10. The ghost detector according to claim 2, wherein said correlation signal output means comprises an SAW convolver.

11. A ghost suppressor comprising:
   video component signal output means for converting a received video signal to a predetermined intermediate frequency component signal and for detecting the intermediate frequency component signal to produce a video component signal;
   switching means for extracting a horizontal synchronous component signal from the video component signal and for switching on the video component signal to produce at least two video output signals;
   video output signal processing means for performing a predetermined time axis reversal on one of the video output signals and for delaying the other video output signal by a predetermined time in accordance with the time axis reversal;
   correlation operating means for operating the correlation between the respective video output signals thus processed by said video output signal processing means to provide a correlation output signal corresponding to a ghost component contained in the video component signal; and
   ghost component suppressing means for synthesizing a control signal that has been given a predetermined delay time and amplitude on the basis of the correlation output signal with the video component signal so as to suppress the ghost component.

12. The ghost suppressor according to claim 11, wherein said video component signal output means comprises a frequency converter for converting the received video signal to the intermediate frequency component signal and a synchronous detection circuit for performing synchronous detection of the intermediate frequency component signal.

13. The ghost suppressor according to claim 11, wherein said switching means comprises a synchronous separation circuit for extracting the horizontal synchronous component signal from the video component signal, a switch pulse generating circuit for generating a horizontal synchronous switch pulse from the horizontal synchronous component signal, and switchers, driven in response to the horizontal synchronous switch pulse, for switching on the video component signal.

14. The ghost suppressor according to claim 11, wherein said video output signal processing means comprises a scan reverse circuit for reversing the time axis of one of the video output signals and a delay circuit for time delaying the other video output signal.

15. The ghost suppressor according to claim 11, wherein said correlation operating means comprises an SAW convolver.

16. The ghost suppressor according to claim 11, wherein said ghost component suppressing means comprises an adder for receiving the video component signal, a delay circuit for delaying the output from said adder, and a factor imparting circuit for amplitude controlling the delayed output from said delay circuit to feed the controlled output back to said adder.

* * * * *